US005367349A

United States Patent [19]

Zeiler

[11] Patent Number: 5,367,349

[45] Date of Patent: Nov. 22, 1994

[54] AMUSEMENT PROJECTOR

[76] Inventor: Robert Zeiler, 452 Girard St., Johnstown, Pa. 15905-3320

[21] Appl. No.: 153,156

[22] Filed: Nov. 17, 1993

[51] Int. Cl.[5] ..................... G03B 21/14

[52] U.S. Cl. ..................... 353/43; 353/97; 362/202

[58] Field of Search ..................... 353/43, 80, 46, 35, 353/47, 50, 51; 362/202, 208, 282; 446/485; 352/62, 97, DIG. 4

[56] References Cited

U.S. PATENT DOCUMENTS 852,363 4/1907 Wheeler .
3,401,596 9/1968 Hirsch ..................... 353/43
3,705,983 12/1972 Yamada ..................... 362/158
3,877,171 4/1975 Sloop et al. ..................... 446/485

*Primary Examiner*—William A. Cuchlinski, Jr.
*Assistant Examiner*—William C. Dowling
*Attorney, Agent, or Firm*—Wegner, Cantor, Mueller & Player

[57] ABSTRACT

An amusement projector including an elongated motion rod housing having an axis, a proximal end and an objective end; structure for connecting the proximal end of the elongated motion rod housing to a light source; a continuously rotatable motion rod having a first end and a second end, the continuously rotatable motion rod being connected to the motion rod housing substantially perpendicular to the axis of the motion rod housing; and a dynamic silhouette producing mask mounted on the motion rod.

16 Claims, 3 Drawing Sheets

AMUSEMENT PROJECTOR

FIELD OF THE INVENTION

The present invention relates to an amusement projector and more particularly to a amusement projector having a continuously rotatable shadow producing silhouette mask. The invention can be used to project the moving shadow image of a bat upon a wall, ceiling or other surface.

BACKGROUND OF THE INVENTION

Amusement devices have been provided with moving parts to create a dynamic image. U.S. Pat. No. 852,363, the entire disclosure of which is herein incorporated by reference, describes a cylindrical toy with the image of a person's head having openings in the eyes. A rotatable drum with pictures of different pairs of eyes is located behind the head and manually spinning the drum reveals different eye images. The drum is continuously rotatable about an axis that is parallel to the cylindrical axis of the toy.

Amusement devices have been provided with projectors for casting shadows in a darkened room. Flashlights have been used as a light source in order to cast shadows for amusement purposes. U.S. Pat. No. 3,401,596, the entire disclosure of which is hereby incorporated by reference, describes a flashlight with a front lens having a mask for projecting a shadow image. In use, both the lens and the shadow casting mask are stationary.

It has been previously known to project moving shadow images by holding the fingers of the hand in the beam of a flashlight and manipulating the fingers so as to cast a dynamic shadow image upon a wall or ceiling in a darkened room. Various other opaque objects have previously been placed in the beam of a flashlight and manipulated in order to create a dynamic shadow image. U.S. Pat. No. 2,048,365, the entire disclosure of which is hereby incorporated by reference, describes an elongated box, for use with a flashlight or other light source, having silhouette producing slides or masks. The slide or masks are reciprocally movable about an axis parallel to the elongated axis of the box. Light sources have been provided with movable filters. U.S. Pat. No. 3,705,983, the entire disclosure of which is hereby incorporated by reference, describes a flashlight with a pair of semicircular movable filters in front of the light source. Thus, the flashlight can selectively project a colored beam or a noncolored beam. The filters are reciprocally movable about an axis that is perpendicular to the axis of the assembly.

U.S. Pat. No. 5,031,080, the entire disclosure of which is hereby incorporated by reference, describes a cockpit light assembly with a movable infra-red filter element in front of the light source. The filter is reciprocally movable about an axis that is perpendicular to the axis of the assembly.

Amusement devices have been provided with movable reflectors. U.S. Pat. No. 3,877,171, the entire disclosure of which is hereby incorporated by reference, describes a flashlight with a rotatable reflector. Although this reflector is continuously rotatable, the rotation necessarily takes place about an axis that is coaxial with the principle axis of the device in order to deflect the light beam in a circular pattern.

SUMMARY OF THE INVENTION

The present invention is directed to an amusement projector including a dynamic silhouette producing mask that is continuously rotatable about an axis that is substantially perpendicular to the principle axis of the projector. A principle object of the invention is to project dynamic shadow images.

Other objects, advantages and features of the present invention will be more readily appreciated and understood when considered in conjunction with the following detailed description and drawings.

BRIEF DESCRIPTION OF THE DRAWINGS

These and other aspects of the invention are apparent from the following drawings, in which.

DESCRIPTION OF THE PREFERRED EMBODIMENTS

Figure 1:
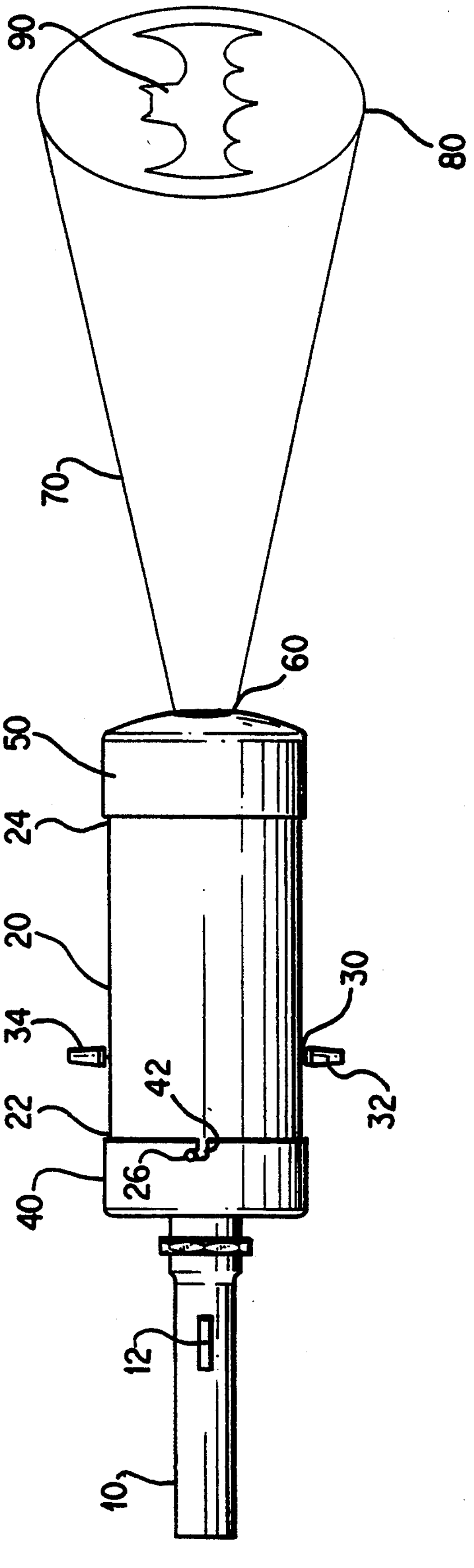
FIG. 1 illustrates an orthographic elevation view of an amusement projector according to the present invention.

All the disclosed embodiments can be made using conventional materials and procedures without undue experimentation. All the disclosed embodiments are useful. The invention and advantageous details are explained more fully below with reference to exemplary embodiments and with the aid of the drawings.

Referring to the drawings, it can be seen that the amusement projector has a generally elongated cylindrical shape. When a light source is activated, the amusement projector emits a dynamic silhouette mask intercepted cone of flux that casts a moving shadow.

Referring to FIG. 1, a handle 10 is provided with a light source, which is not shown. The light source is an internal light source activated by switch 12. Providing the amusement projector with an integral light source prevents the light source from becoming separated and mislaid from the elongated housing. Alternatively, handle 10 can be a standard flashlight. Using a standard flashlight as the light source reduces the cost of the amusement projector.

An elongated motion rod housing 20 defining an axis has a proximal end 22 and an objective end 24. Motion rod housing 20 is provided with a proximal engagement pin 26 and a distal engagement pin, the later of which is not shown.

The motion rod housing 20 is provided with a continuously rotatable motion rod 30. The continuously rotatable motion rod 30 is connected to the motion rod housing 20 substantially perpendicular to the axis of the motion housing 20. The continuously rotatable motion rod 30 is mounted within, and extends from, the motion rod housing 20. The continuously rotatable motion rod 30 extends through the motion rod housing 20 twice and includes two motion knobs 32 and 34 mounted on the ends of the continuously rotatable motion rod 30.

A proximal end cap 40 is attached to the proximal end 22 of the motion rod housing 20. Proximal end cap 40 is also attached to handle 10. The proximal end cap 40 is provided with an engagement slot 42 for receiving proximal engagement pin 26. The proximal end cap 40 has standard threads, which are not shown, for the manually removable attachment of the proximal end cap 40 to handle 10. When the amusement projector is provided with a proximal end cap 40 having standard threads, or other attachment fitting which engages a standard flashlight, the amusement projector can be sold without the flashlight. Thus, providing the proximal end cap with the standard threading, or other attachment fitting, provides the advantage of lower cost. Such a fitting also provides the additional advantage that a high power flashlight having a variable focal point can be used to operate the amusement projector.

An objective end cap 50 is attached to the objective end 24 of the motion rod housing 20. The objective end cap 50 is provided with an engagement slot, which is not shown.

The objective end cap 50 includes an optical window 60. In a preferred embodiment the optical window 60 is mounted on the objective end cap 50 so as to be substantially perpendicular to the axis of the motion rod housing 20 when the objective end cap 50 is attached to the motion rod housing 20.

The amusement projector emits a cone of flux 70 when the light source is activated by switch 12. The cone of flux 70 project an image 80. The image 80 includes a dynamic shadow 90.

Figure 2:
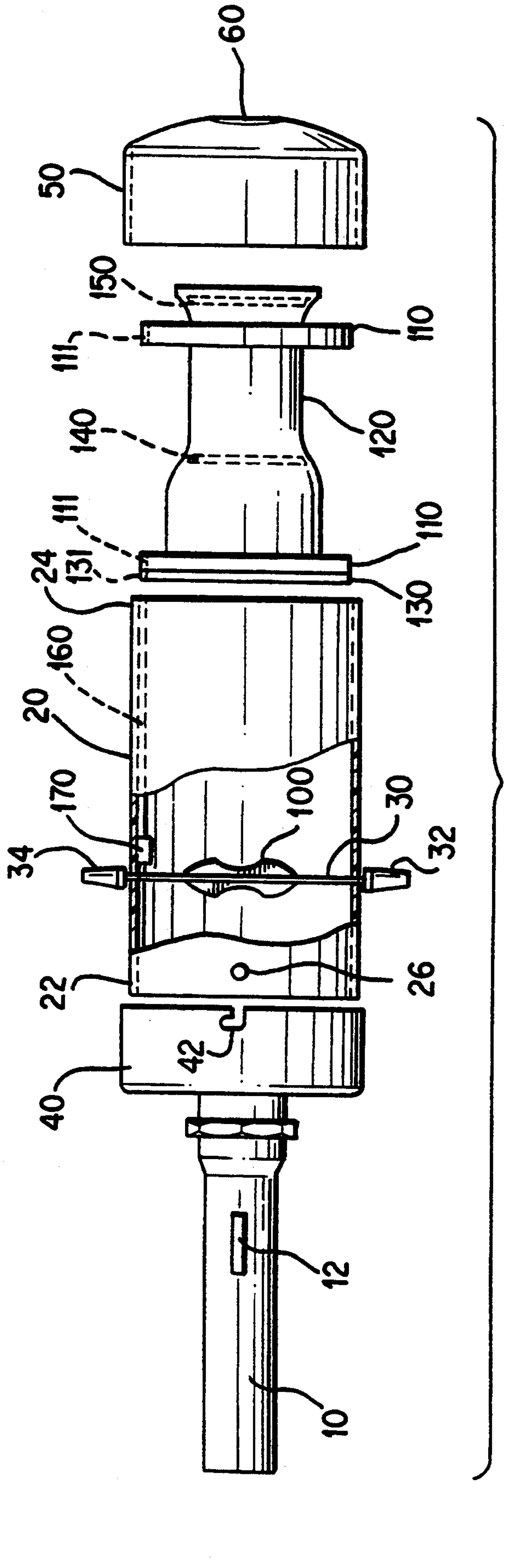
FIG. 2 illustrates an orthographic exploded view of the amusement projector illustrated in FIG. 1.

Referring to FIG. 2, the handle 10 and proximal end cap 40 are shown disconnected from the proximal end 22 of motion rod housing 20. Similarly, objective end cap 50 is shown disconnected from the objective end 24 of motion rod housing 20.

Dynamic silhouette producing mask 100 is mounted on continuously rotatable motion rod 30. Rapidly rotating dynamic silhouette producing mask 100 causes dynamic shadow 90 to appear to flutter with flight simulation movement. The dynamic silhouette producing mask is manually removably attached to motion rod 30. Thus, various interchangeable dynamic silhouette producing masks can be used to create and project different and highly varied images.

A plurality of centering rings 110 are mounted within the motion rod housing 20. The plurality of centering rings can be manually removably mounted within the motion rod housing 20. FIG. 2 shows the centering rings 110 removed from the motion rod housing 20 as part of a subassembly.

An elongated magnifier housing 120 defining an axis can be mounted within the plurality of centering rings 110. The axis of the magnifier housing 120 is coaxial with the axis of the motion rod housing 20. Planar transparent screen 130 having a static silhouette producing mask is mounted on the magnifier housing 120 substantially perpendicular to the axes of both the motion rod housing 20 and the magnifier housing 120. The planar transparent screen 130 can be manually removably attached to magnifier housing 120. Thus, various interchangeable planar transparent screens to create and project different and highly varied images.

The magnifier housing is provided with at least one lens. A preferred embodiment includes a first magnifier lens 140 and a second magnifier lens 150, both of which are mounted within the magnifier housing 120.

Alignment rib 160 is mounted on an internal surface of the motion rod housing 20. Alignment rib 160 engages alignment rib slot 131 of planar transparent screen 130 and alignment rib slots 111 of centering rings 110.

An alignment rib stop 170 is mounted on alignment rib 160. Thus, the planar transparent screen 130 is adjacent alignment rib stop 170 when the amusement projector is assembled.

Figure 3:
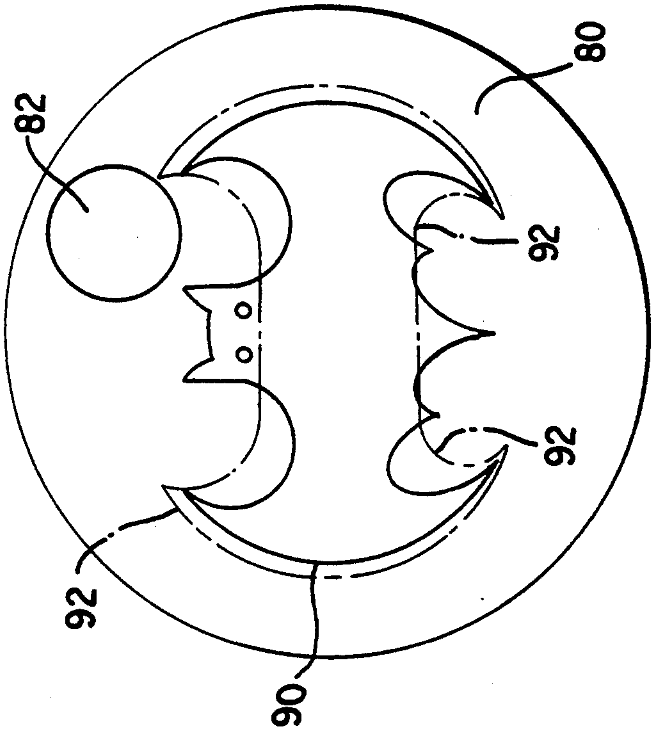
FIG. 3 illustrates an image cast by the amusement projector illustrated in FIG. 1.

Referring to FIG. 3, the image 80 cast by the amusement projector will be further described. Image 80 includes a colored portion 82 that is created by a color filter, not shown, mounted on planar transparent screen 130. Dynamic shadow 90 is of a bat created in part by the static silhouette producing mask of planar transparent screen 130 and includes fluttering flight simulation edges 92 which are created by dynamic silhouette producing mask 100.

Figure 4:
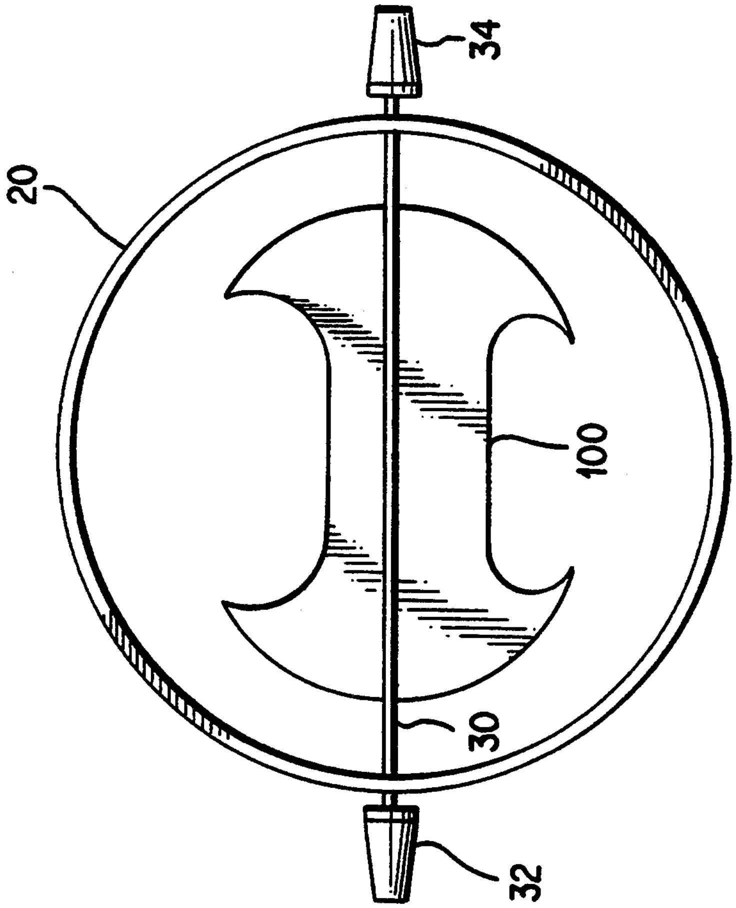
FIG. 4 illustrates a cross-sectional view of the amusement projector illustrated in FIG. 1.

Referring to FIG. 4, a cross-sectional view of motion rod housing 20 shows dynamic silhouette producing mask 100 mounted on continuously rotatable motion rod 30. Motion knobs 32 and 34 are mounted on the ends of continuously rotatable motion rod 30. Rapidly rotating either of motion knobs 32 or 34 causes the flight simulation edges shown in FIG. 3 to flutter with flight simulation movement. Motion rod housing 20 can be provided with a plurality of motion rods so as to simultaneously actuate a plurality of dynamic silhouette producing masks.

EXAMPLE

A specific embodiments of the invention will now be further described by the following, non-limiting example.

An cylindrical motion rod housing having a length of 8.75" and an internal diameter of 4.125" is provided with a continuously rotatable metal motion rod mounted substantially perpendicular to the axis of the motion rod housing- The motion rod is provided with a permanently attached dynamic silhouette producing mask. An elongated plastic magnifier housing is permanently mounted within two centering rings which are permanently mounted within the motion rod housing. A plastic planar transparent screen having a static silhouette producing mask in the shape of a bat is permanently mounted on the magnifier housing substantially perpendicular to the axes of both the motion rod housing and the magnifier housing. A 5.5 power magnifier lens 3.875" in diameter is permanently mounted within the magnifier housing substantially perpendicular to the axis of the magnifier housing. A 6.75 power magnifier lens 1.5" in diameter is mounted within the magnifier housing 3.5" away from, and parallel to, the 5.5 power magnifier. An objective end cap is permanently mounted to the objective end of the motion rod housing and provided with an optical window 1.375" in diameter.

While there is shown and described herein certain specific structures embodying this invention for the purpose of clarity of understanding, the same is to be considered as illustrative in character, it being understood that only preferred embodiments have been shown and described. It will be manifest to those skilled in the art that certain changes, various modifications and rearrangements of the parts may be made without departing from the spirit and scope of the underlying inventive concept and that the same is not limited to the particular forms herein shown and described except insofar as indicated in the scope of the appended claims.

The entirety of everything cited above or below is expressly incorporated herein by reference.

What is claimed is:

1. An amusement projector comprising:

an elongated motion rod housing having an axis, a proximal end and an objective end;

a light source connected to the proximal end of the elongated motion rod housing;

a continuously rotatable motion rod having a first end and a second end, said continuously rotatable motion rod being connected to the motion rod housing substantially perpendicular to the axis of the motion rod housing; and a dynamic silhouette producing mask mounted on the motion rod.

2. The amusement projector of claim 1 further comprising a proximal end cap attached to the proximal end of the motion rod housing wherein said proximal end cap has threads for manually removable attachment of said proximal end cap to a flashlight.

3. The amusement projector of claim 1 further comprising an objective end cap attached to the objective end of the motion rod housing wherein said objective end cap further comprises an optical window mounted on the objective end cap substantially perpendicular to the axis of the motion rod housing.

4. The amusement projector of claim 1 further comprising a planar transparent screen having a static silhouette producing mask mounted within the motion rod housing substantially perpendicular to the axis of the motion rod housing.

5. The amusement projector of claim 1 further comprising a plurality of centering rings mounted within the motion rod housing;

an elongated magnifier housing having an axis mounted within the plurality of centering rings such that the axis of the magnifier housing is substantially coaxial with the axis of the motion rod housing; and at least one lens mounted within the magnifier housing.

6. An amusement projector comprising:

an elongated motion rod housing having an axis, a proximal end and an objective end;

a light source connected to the proximal end of the elongated motion rod housing;

a continuously rotatable motion rod having a first end and a second end, said continuously rotatable motion rod being connected to the motion rod housing substantially perpendicular to the axis of the motion rod housing;

a dynamic silhouette producing mask mounted on the motion rod;

a first motion knob mounted on the first end of the motion rod; and a second motion knob mounted on the second end of the motion rod, wherein the motion rod extends through the motion rod housing twice.

7. The amusement projector of claim 5 further comprising a proximal end cap attached to the proximal end of the motion rod housing wherein said proximal end cap has threads for manually removable attachment of said proximal end cap to a flashlight.

8. The amusement projector of claim 6 further comprising an objective end cap attached to the objective end of the motion rod housing wherein said objective end cap further comprises an optical window mounted on the objective end cap substantially perpendicular to the axis of the motion rod housing.

9. The amusement projector of claim 6 further comprising a planar transparent screen having a static silhouette producing mask mounted within the motion rod housing substantially perpendicular to the axis of the motion rod housing.

10. The amusement projector of claim 6 further comprising a plurality of centering rings mounted within the motion rod housing;

an elongated magnifier housing having an axis mounted within the plurality of centering rings such that the axis of the magnifier housing is substantially coaxial with the axis of the motion rod housing; and at least one lens mounted within the magnifier housing.

11. An amusement projector comprising:

an elongated motion rod housing having an axis, a proximal end and an objective end;

means for connecting the proximal end of the elongated motion rod housing to a light source;

a continuously rotatable motion rod having a first end and a second end, said continuously rotatable motion rod being connected to the motion rod housing substantially perpendicular to the axis of the motion rod housing; and a dynamic silhouette producing mask mounted on the motion rod.

12. The amusement projector of claim 11 further comprising a first motion knob mounted on the first end of the motion rod and a second motion knob mounted on the second end of the motion rod, wherein the motion rod extends through the motion rod housing twice.

13. The amusement projector of claim 11 wherein said means for connecting the proximal end of the elongated motion rod housing to a light source comprises a proximal end cap attached to the proximal end of the motion rod housing and said proximal end cap has threads for manually removable attachment of said proximal end cap to a flashlight.

14. The amusement projector of claim 11 further comprising an objective end cap attached to the objective end of the motion rod housing wherein said objective end cap further comprises an optical window mounted on the objective end cap substantially perpendicular to the axis of the motion rod housing.

15. The amusement projector of claim 11 further comprising a planar transparent screen having a static silhouette producing mask mounted within the motion rod housing substantially perpendicular to the axis of the motion rod housing.

16. The amusement projector of claim 11 further comprising a plurality of centering rings mounted within the motion rod housing;

an elongated magnifier housing having an axis mounted within the plurality of centering rings such that the axis of the magnifier housing is substantially coaxial with the axis of the motion rod housing; and at least one lens mounted within the magnifier housing.

* * * * *